Oct. 18, 1927.

J. F. WHITEHEAD

MIRROR SUPPORT

Filed Dec. 22, 1924

1,646,379

Inventor
J. Frazer Whitehead

By Whittemore, Hulbert, Whittemore
& Belknap    Attorneys

Patented Oct. 18, 1927.

1,646,379

UNITED STATES PATENT OFFICE.

JAMES FRAZER WHITEHEAD, OF DETROIT, MICHIGAN, ASSIGNOR TO KALES STAMPING COMPANY, OF DETROIT, MICHIGAN, A CORPORATION OF MICHIGAN.

MIRROR SUPPORT.

Application filed December 22, 1924. Serial No. 757,474.

The invention relates to mirror supports and has for an object to provide a rear view mirror for vehicles. A further object of the invention is to provide a mirror which may be adjusted to a plurality of positions.

In mirrors of the rear view type, such as are mounted on motor vehicles difficulty has been experienced in supporting the mirror from the vehicle in such a position that the view in the rear of the vehicle is readily and properly observed by the occupant of the car. It has been proposed to provide the mirror with an universal connection to its support. Such a connection affords ready universal inclination of the mirror but does not permit of adjustments in the plane of the mirror such as vertically of the mirror so as to become adapted to various types of vehicles and suited to occupants of various heights. As a partial remedy of the aforesaid objections, it has been proposed to provide the mirror with an eccentric mounting whereby it may be rotated 180° to obtain a variation in the vertical position of the mirror depending upon the eccentricity.

My invention contemplates means whereby the mirror may be readily adjusted to a plurality of positions in the plane of the mirror so as to obtain a wide range of adjustments. A further object resides in the provision of a mirror support which may be cheaply manufactured preferably by stamping the parts from metal.

With these and other objects in view, the invention resides in the novel features of construction and combination and arrangements of parts as more fully hereinafter described and claimed.

Referring to the drawings:—

Figure 1 indicates a perspective view of one embodiment of my invention;

Figure 1:
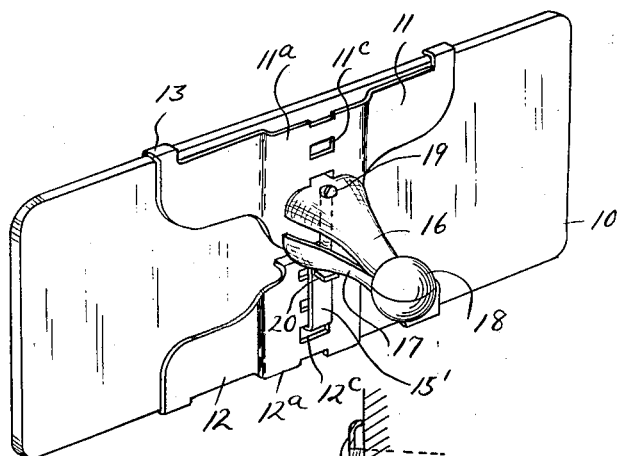
Figure 2:
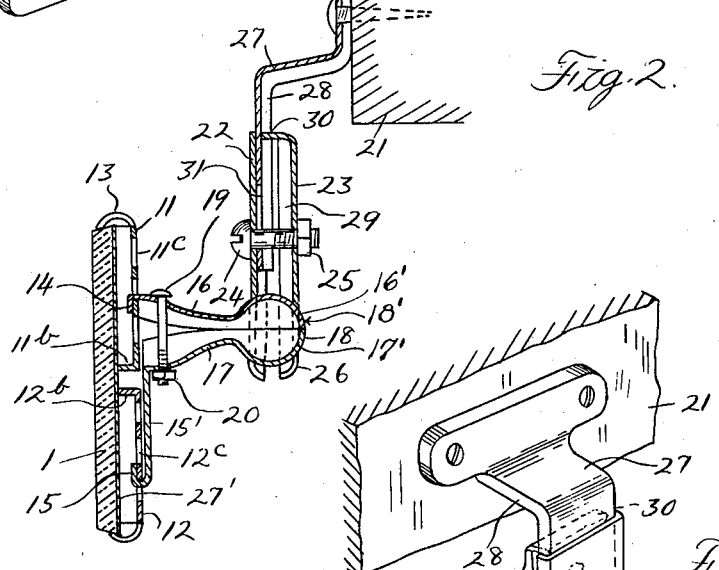
Figure 2 is a section along the line 2—2 of Figure 1.
Figure 3:
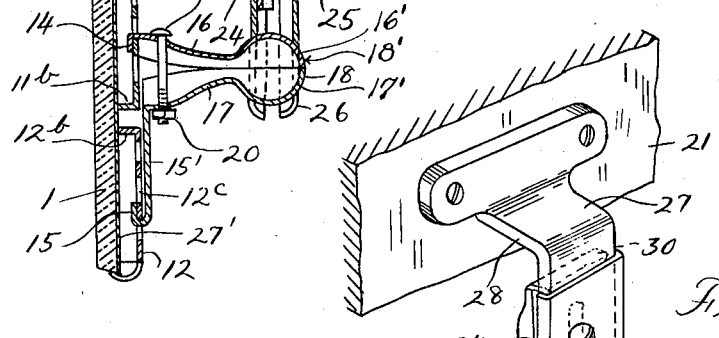
Figure 3 is a fragmentary view showing the supporting bracket.

In the drawings reference character 10 indicates a mirror embraced at opposite edges respectively by the complementary clamping sections 11 and 12. The sections 11 and 12 of a suitable holder embodying by invention are preferably metal stampings and may have their central portions pressed outwardly at 11ª, 12ª, the said portions terminating in the bent over edges 11ᵇ, 12ᵇ. As shown, each of the clamping members is provided with a plurality of aligned spaced recesses 11ᶜ, 12ᶜ respectively engaged by the return-bent portions 14 and 15 of the complementary members 16 and 17 of a laterally extending arm 18. As shown, the return-bent portion 15 is located at the lower end of a depending extension 15 of the arm section 17. Both sections 16 and 17 have the rounded end portions 16′ and 17′ forming a suitable ball 18′.

For clamping together the members 16 and 17, at the same time causing the complementary clamping members 11 and 12 to firmly embrace the mirror, I provide a fastener such as the screw bolt 19 and nut 20.

For universally mounting the mirror from a fixed part of the vehicle as indicated at 21, I provide the complementary supporting bracket members 22, 23 formed at one end into the socket 26 engaged by the ball 18.

The member 22 is preferably provided with side flanges 26′ for strengthening purposes and also to form a guide for the fixed supporting member 27 which is screwed or otherwise fastened to the part 21. The member 27 is also preferably formed with side flanges 28 for strengthening purposes and also for cooperating with flanges 26′ for relatively locating the members 22 and 27. The complementary member 23 is likewise preferably formed with flanges 29 and the bent fulcrum part 30 engaging the member 27. The latter part may be provided with slot 31 engageable by screw bolt 24 and nut 25 which parts serve to firmly lock parts 22, 23 and 27 all together and yet by reason of the slot 31 permit relative adjustment between the supporting member 27 and the complementary members 22, 23. Thus the mirror 10 may be adjusted longitudinally of the member 27, or as illustrated in the drawings the mirror 10 may be adjusted to a plurality of elevations.

Beneath the clamping members 11 and 12 I may place a strip of paper 27′ or other suitable material preferably cut to conform with the shape of the clamping members and adapted to afford a yielding connection between the clamping members and mirror.

In assembling the device, the clamping members are placed in position and the bracket member 22 secured to the part 21. One of the recesses 11ᶜ is then engaged by the bent end 14 of the member 16 depending on the adjustment desired for the mirror. The bent end 15 of the complementary member 17 is then engaged in a recess of the bracket member 12, it being understood that the extension 15' is of such a length to permit proper engagement of the bent end 15 with one of the recesses of the member 12 corresponding to an engagement of the bent end 14 with any of the recesses of the clamping member 11. In such position the complementary members 16 and 17 and the clamping members 11 and 12 are respectively and simultaneously drawn firmly together by reason of the screw bolt 19 and nut 20.

The ball 18 is next placed in position in the socket 26 formed by the complementary bracket members 22, 23 and by reason of the bolt 24 and nut 25 these parts are held in assembled position to universally connect the mirror 10 and the bracket members 22, 23.

In such position the mirror 10 may be universally adjusted and also rotated 180° to change the elevation or position of the mirror dependent upon the extent of eccentricity of the members 16, 17 and the mirror center. It will further be noted that my invention includes means for readily changing the degree of eccentricity so as to afford a wide range of vertical adjustments of the mirror through a plurality of small increments. From the foregoing description it will be noted that the mirror 10 may be adjusted to a plurality of positions by reason of the engagement between the complementary members 16, 17 and the clamping members 11, 12; adjustment may also be had by reason of the slotted connection between the member 27 and the supporting bracket members 22, 23. I have also provided an inexpensive construction for supporting the mirror such construction being readily assembled and adjusted to its various positions.

The supporting bracket members 22, 23 may be secured to any part of the car as might be found convenient, such as suspending the mirror horizontally or vertically. If desired the supporting bracket members might be formed with a hook-shaped end for engagement with various parts of the vehicle instead of screw connection as shown.

While it is believed that from the foregoing description, the nature and advantage of my invention will be readily understood, I desire to have it understood that I do not limit myself to what is herein shown and described and that such changes may be resorted to when desired as fall within the scope of the claims.

What I claim as my invention is:—

1. In combination with a mirror, clamping members formed for engagement with the mirror, each of said clamping members being formed with a plurality of recesses spaced longitudinally thereof, complementary members selectively engageable at one end with the recesses of the respective clamping members and ball-shaped at the other end, and a supporting bracket provided with a socket adapted to cooperate with the said ball-shaped end of the complementary members for providing universal movement between the mirror and support.

2. In combination with a mirror, cooperating clamping members spanning the mirror, and provided with bent-over portions for engagement with opposite edges respectively of the mirror, said clamping members being formed with a plurality of recesses spaced longitudinally thereof, complementary members selectively engageable at one end in the recesses of the respective clamping members and shaped at their other ends to form a complementary part of a universal joint, and a supporting bracket provided with a part cooperating with said complementary part to form therewith a universal connection between the supporting bracket and the said complementary members.

3. In combination with a mirror, clamping members spanning the mirror and embracing opposite edges thereof, each of said clamping members provided with a plurality of aligned spaced recesses and a laterally extending arm having complementary sections, said sections being provided with return bent portions at one end thereof selectively engageable with said recesses.

4. In combination with a vehicle mirror, a member fixed to a part of the vehicle, complementary bracket members slidably engaging said fixed member, means for slidably adjusting the bracket members relatively to said fixed member, clamping means for said mirror comprising complementary sections, said sections provided with a plurality of aligned spaced recesses, and means connecting said clamping means with said bracket having one end thereof engageable with said recesses and the other end adapted to have universal adjustment with said bracket.

5. In combination with a vehicle mirror, a supporting member fixed to a part of the vehicle, means for adjusting the mirror longitudinally of said supporting member including complementary bracket members, said bracket members having side flanges, said supporting member also provided with side flanges adapted to cooperate with the flanges aforesaid for relatively locating the said bracket members.

6. In combination with a mirror, and a holder therefore, said holder comprising complementary clamping sections, each of said clamping sections being formed with a plurality of recesses spaced longitudinally thereof, and a laterally extending arm also composed of complementary sections selectively engageable at one end with the recesses of the respective clamping members for vertical adjustment of the mirror with respect to said arm.

7. The combination with a mirror and a supporting member therefor, of a holder for the mirror having a plurality of spaced recesses therein, and a laterally extending arm having one end universally mounted on said supporting member and having portions at the opposite end thereof engageable in said recesses.

8. In combination with a mirror, clamping members formed for engagement with the mirror, each of said clamping members being formed with a plurality of recesses spaced longitudinally thereof, complementary members selectively engageable at one end with the recesses of the respective clamping members, and a supporting bracket for said members.

9. In combination with a vehicle mirror, a clamping member embracing the mirror and provided with a slot, complementary members formed at one end for engagement with said slot and provided at the other end thereof with portions forming a ball, a supporting bracket fixed to the vehicle and provided with a socket engageable by said ball for affording universal movement of the mirror.

10. In combination with a vehicle mirror, a clamping member embracing the mirror having a raised portion and a pair of spaced elongated slots in said portion, a laterally extending arm including complementary sections having means at one end of each of said sections selectively engageable in said slots, and means affording a universal connection between said arm and a fixed part of the vehicle.

11. In combination with a vehicle mirror, a holder for said mirror having a raised portion provided with a plurality of slots, a supporting arm having projections engageable with said slots and having a ball at one end thereof, and a bracket member having a portion attachable to a vehicle and having another portion receiving said ball and affording universal movement for the mirror.

12. In combination, a rear view mirror for vehicles, a holder for said mirror including complementary clamping members, one of said members being provided with a raised portion, said raised portion being provided with spaced slots, a laterally extending supporting arm for said mirror, and a connection between said arm and mirror including lugs projecting from said arm at one end thereof and engaging certain of the slots aforesaid, said lugs being selectively engageable with said slots.

13. In combination with a vehicle mirror, clamping members spanning the mirror and embracing opposite edges thereof, one of said clamping members provided with a raised portion substantially parallel with the plane of the mirror, said raised portion having spaced elongated slots cut out therefrom, and a member having bent ends engaging said slots for adjusting the mirror to a plurality of positions vertically with respect to said member.

In testimony whereof I affix my signature.

J. FRAZER WHITEHEAD